2,920,425

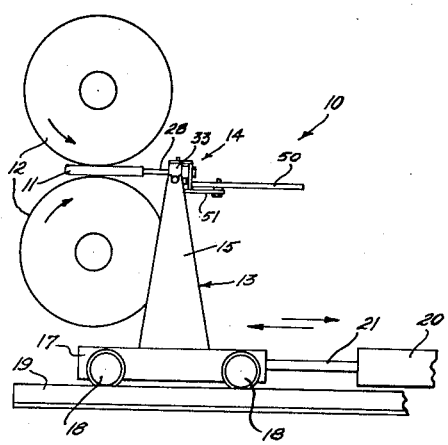

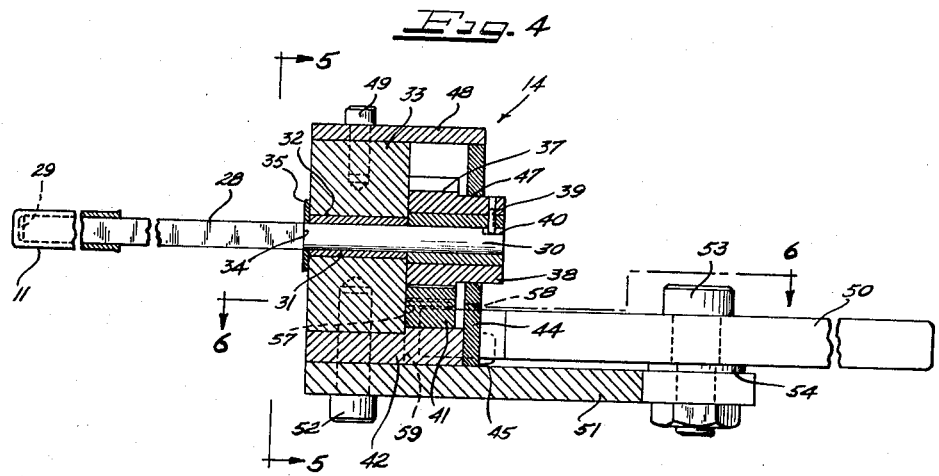
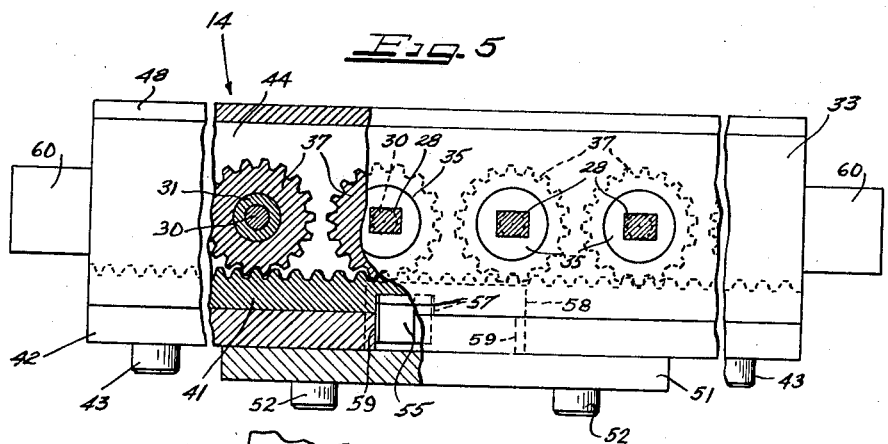
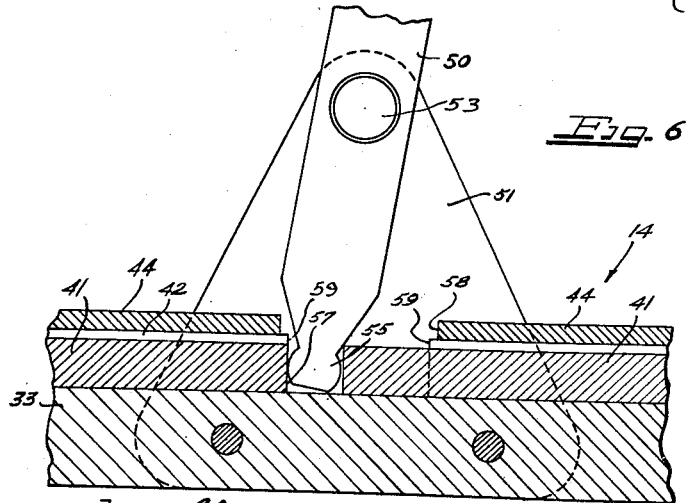

GANG SPINDLE FIXTURE FOR KNIFE HANDLES OR THE LIKE

John E. Oathout, Royal Oak, Mich., assignor to Lyon Incorporated, Detroit, Mich., a corporation of Delaware Application July 19, 1957, Serial No. 673,049

12 Claims. (Cl. 51—84)

The present invention relates to improvements in apparatus for surface finishing a plurality of articles simultaneously between finishing rollers such as buffs, and is more particularly concerned with the provision of a fixture that is especially suitable for handling tubular articles such as knife handles or the like.

In the mass production of relatively small diameter articles requiring highly finished surface treatment, such as knife handles which must be buffed to a smooth finish, it is highly desirable to attain high production rates with consistent uniformity of results. However, since the articles are small and generally multi-sided there are serious problems that stand in the way of attaining these ends. Tableware knife handles are generally provided with front and rear faces and side faces which are relatively angularly related and may additionally have certain design contours thereon. Individual buffing of such knife handles is a slow and costly procedure.

According to the present invention, an important object is to provide improved means for simultaneously uniformly surface finishing a plurality of articles such as tableware knife handles.

Another object of the invention is to provide novel gang buffing apparatus.

A further object of the invention is to provide a fixture for supporting and manipulating a large number of elongated tubular articles for simultaneous surface finishing such as buffing.

Still another object of the invention is to provide a gang spindle fixture which is adapted for quick loading and unloading of elongated tubular articles such as tableware knife handles with respect to the spindle, and with which highly uniform surface finishing results are attainable.

Still another object of the invention is to provide a novel gang spindle buffing fixture for tableware knife handles or the like having novel means for simultaneous turning of spindles to present, successively, common angular faces of the several spindle-supported articles to the same pair of buffing rolls.

Other objects, features and advantages of the present invention will be readily apparent from the following detailed description of a preferred embodiment thereof taken in conjunction with the acompanying drawings, in which:

Figure 1 is a more or less schematic side elevational view of apparatus embodying features of the invention;

Figure 2 is a top plan view of a gang spindle article supporting fixture of the assembly shown in Figure 1;

Figure 3 is an enlarged fragmentary side elevational view of the upper or head portion of the fixture;

Figure 4 is an enlarged fragmentary sectional detail view taken substantially on the line 4—4 of Figure 2;

Figure 5 is a fragmental sectional elevational detail view taken substantially on the line 5—5 of Figure 4 and with certain portions broken away for illustrative purposes; and Figure 6 is a fragmentary sectional plan view taken substantially on the line 6—6 of Figure 4.

According to the present invention, an apparatus or fixture 10 is provided by which a large number of articles such as tubular tableware knife handles 11 are simultaneously presented between opposed correlated surface finishing rolls 12 such as buffs. The knife handles 11 are supported to be presented for buffing by the roll 12 simultaneously on opposite faces of the handles.

In order to present all portions of the opposite surfaces or faces of the knife handles 11 uniformly to the nip of the rolls 12, means are provided for relatively actuating the fixture 10 and the rolls 12 to move the knife handles 11 longitudinally uniformly throughout a buffing stroke. Either the buffing rolls 12 may be moved in a to and fro movement, or the fixture 10 may be so moved relative to the rolls. In the present instance it is the fixture 10 that is constructed and arranged for uniform to and fro movement and to this end it includes a mobile carriage 13 carrying a head structure 14 by which the knife handles 11 are supported.

In a desirable form, the carriage 13 comprises a pair of spaced apart upright standards 15 or side members respectively mounted upon a base frame structure including side members 17 provided with wheels 18 arranged to ride upon respective parallel tracks 19 for to and fro movement as indicated by the directional arrows in Figure 1. Such movement may be imparted to the carriage by means such as fluid actuators 20 which may comprise pneumatic cylinders from which extend reciprocably motivating piston rods 21 attached to the respective base frame side members 17. Motivating compressed air may be supplied to the actuator cylinders 20 through a duct system 22 by way of a control and distributor valve 23 from a compressed air tank 24 receiving air from a compressor 25 actuated as by means of an electric motor 27.

A large number, thirty-seven in the illustrated embodiment, of the knife handles 11 are adapted to be workably supported by the fixture head 14. To this end, the desired number of individual article receiving and supporting spindles 28 is provided each to receive one of the knife handles 11. Each of the spindles 28 is preferably of a cross-sectional shape to fit in free sliding relation into the tubular knife handle, such cross-sectional shape in this instance being quadrangular is best seen in Figs. 4 and 5. To provide complete support for the relatively thin wall knife handle and avoid collapse of any portion of the handle, all opposing internal surfaces of the knife handle are closely engaged, inclusive of the blind end of the handle bore which may be rounded and therefore the distal extremity or tip of the spindle 28 is also rounded as shown at 29.

Since the knife handles 11 are quadrangular in cross-sectional shape it will be clear that buffing will require two passes between the buffing rolls 12. In order to enable turning of the knife handles 11 about their axis to enable presenting the respective pairs of opposite surfaces to the nips of the buffing rolls 12 on successive passes between the rolls, the spindles 28 are mounted on the head structure 14 in a manner to be pivoted about their respective axes. To this end, each of the spindles 28 has a cylindrical shank 30 supported rotatably in a bushing 31 serving as a bearing in a suitable bore 32 through a head body bar 33. A shoulder 34 at juncture of the shank 30 with the quadrangularly sectioned body of the spindle 28 opposes an anti-friction stop washer 35 of a diameter to bear against the outer face of the head bar 33.

At its distal end portion, the shank 30 of each of the spindles projects substantially beyond the rear face of the head bar 33 and carries fixedly thereon a pinion 37, preferably provided with an axial journal extension 38 secured as by means of a locking pin 39 extending radially therein and engaging a flat 40 on the rear extremity portion of the spindle shank.

All of the spindles 28 are maintained for turning in unison by a toothed rack bar 41 with which the gears or pinions 37 mesh. In the illustrated instance, the head bar 33 is disposed horizontally and the rack bar 41 is disposed horizontally underneath the pinions 37 at the back of the head bar 33, with a supporting flange base bar 42 secured to the underside of the head bar 33 as by means of screws 43 and projecting rearwardly to afford a sliding base or support for the rack bar 41. A protective closure and rack confining vertical plate member 44 is secured as by means of screws 45 to the rear edge of the base plate bar 42 and projects upwardly behind the pinions 37, having bearing apertures 47 through which the journal extensions 38 of the pinions extend. A top closure plate 48 secured to the top of the head bar 33 by means of screws 49 and joining the top edge of the rear closure and rack bar confining plate 44, completes the frame structure of the fixture head 14.

Turning movement of the spindles 28 by a longitudinal shifting of the rack bar 41 and corresponding rotation of the respective pinions 37 may, if preferred, be effected automatically, but in the present instance is accomplished manually through the medium of an actuating member in the form of a handle 50. A support for the handle is provided preferably midway the length of the fixture head 14 by means of a supporting plate 51 which may be of generally triangular form secured adjacent two of corners or angles thereof as by means of respective screws 52 to the underside of the rack-supporting flange plate or bar 42, and with the screws of a length to also thread into the head bar 33. The remaining corner or angular portion of the handle supporting plate 51 projects rearwardly substantially beyond the rear closure plate 44 and has the handle 50 pivotally secured thereupon by means of a bolt-like pivot journal pin 53, there being a spacer washer 54 interposed between the handle and the upper face of the supporting plate 51. The major extent or length of the handle 50 extends rearwardly beyond the pivot 53, and a shorter length projects forwardly and has a head 55 of reduced width and rounded contour in plan in engagement with the rack bar 41.

For effecting an articulated connection between the actuating head or finger 55 of the handle 50 and the rack bar 41, the underside of the rack bar is provided with a knuckle recess or socket 57 (Figs. 5 and 6), affording opposing shoulders with which the actuating tip or head 55 is slidably thrustingly engageable for driving the rack bar 41 longitudinally in respectively opposite directions responsive to pivotal swinging movements of the handle 50 about its pivot. Clearance for the actuating end portion of the handle 50 through the rear closure plate 44 is afforded by a slot 58 therein.

Since turning of the spindles 28 must be limited to 90° in either direction, means are provided for limiting the actuating swinging leverage movements of the handle 50 to a range which will accomplish this purpose. Herein this is simply effected by providing a stop shoulder recess or cut out 59 in the rack supporting base plate 42. The width of the recess 59 is such that it will control the stroke of the handle arm head or finger 55 within opposite extremes or limits by respective engagement of the finger 55 with the shoulders defining the opposite ends of the control slot. In Figures 2 and 6, the handle 50 is shown in full outline at one rack motivating stroke limit. It will be understood that by shifting the handle to move the finger 55 to its opposite limit the opposite rack motivating limit is attained, as shown in dash outline in Figure 2.

Mounting of the fixture head 14 upon the upper ends of the carriage standards 15 is preferably effected in a manner to enable ready assembly or removal of the head structure. To this end, as best seen in Figs. 1 and 3, respective trunnions 60 providing journals are engageable in upwardly opening bearing slots 61 provided in the respective standards 15. Through this arrangement, moreover, the fixture head 14 can be swung by means of the handle 50 about the trunnions 60 from the position shown in full outline in Figures 1 and 3, wherein the spindles 28 are disposed generally horizontally to engage the knife handles 11 between the buffing rolls, into an upward position of the spindles, as shown in dash outline in Fig. 3, for loading and unloading of the knife handles.

In a cycle of operation, the fixture 10 is initially located in a backed off position relative to the buffing rolls 12 which may be continuously driven in respectively opposite directions and with the nips running toward the entry bight with respect to the gang spindle fixture. In this backed off position, the spindles 28 are loaded with respective ones of the knife handles 11, as by means of a loading jig or fixture while the spindles are turned up as shown in dash outline in Fig. 3.

After the spindles have been loaded, the fixture head 14 is turned to project the spindles and the knife handles 11 carried thereby toward the buffing rolls 12, and the pneumatic actuators 20 are operated to drive the carriage 13 forwardly in a uniform buffing stroke to carry the knife handles 11 between the nips of the buffing rolls at a steady rate until the entire opposite faces presented to the roll nips by the particular rotary position of the spindles 28 as determined by the limit position of the handle 50 have been worked on by the buffing rolls. The carriage 13 is then reversed until the knife handles 11 are again free from the buffing rolls, whereupon the position of the handle 50 is reversed to thereby actuate the rack 41 and the pinions 37 to turn the spindles 28 90° and thus position the remaining opposite faces of the knife handles 11 for buffing. The carriage 13 is then again motivated in a full stroke and return to complete the second pass of the knife handles between the buffing rolls and thus complete the buffing cycle. The spindles are then unloaded and reloaded and the buffing cycle repeated.

It will be observed that inasmuch as the buffing rolls 12 turn toward the fixture head 14, their action is to thrust the knife handles 11 toward the spindles 28 at all times while the knife handles are in the nip of the rolls. This is advantageous since it avoids any need for locking the knife handles on the spindle.

It will be understood that modifications and variations may be effected without departing from the scope of the novel concepts of the present invention.

I claim as my invention:

1. In apparatus for simultaneously surface treating a plurality of objects, opposed correlated surface treating rolls, a carriage movable toward and away from the rolls, spindle means on the carriage providing support for a plurality of articles to be surface treated, means for moving the carriage axially of the spindle means to carry the articles into and through the nip of the rolls and return articles in a surface treating pass, and means on said supporting means for partially turning the spindle means on an axis of rotation substantially perpendicular to the axes of rotation of said rolls and adapted to present additional surface areas of the articles for surface treatment in a succeeding pass of the articles between the rolls by action of said carriage.

2. In apparatus of the character described, a pair of correlated surface treating rolls, a fixture for supporting a plurality of articles to be surface treated including a plurality of spindle means and means for turning the spindle means on an axis of rotation substantially perpendicular to the axes of rotation of the rolls to present various portions of the surface of the articles for surface treatment, and means for relatively actuating the rolls and fixture axially of the spindle means to present the articles for surface treatment between the rolls in successive passes in which all of the surfaces of the articles are surface treated.

3. In apparatus for surface treating a plurality of articles between a pair of correlated oppositely rotating surface treating rolls, a reciprocable carriage, a head structure carried on said carriage, said head structure having a plurality of transversely aligned spaced spindles, said spindles being adapted to support respective articles to be surface treated, means for reciprocating the carriage to carry said spindles with the articles thereon in a direction axially of the spindles into surface treating relation to the rolls, and means carried by said head structure for partially turning said spindles about their axes between passes into operative relation to the treating rolls for presenting various surfaces of the articles to the action of the rolls.

4. In buffing apparatus including oppositely turning buffing rolls, a work supporting fixture including a carriage, means for guiding the carriage reciprocably in to and fro movement in a path substantially perpendicular relative to the axes of rotation of said buffing rolls, means for motivating the carriage, a fixture head carried by the carriage, said fixture head having a plurality of coextensive laterally aligned spaced spindles projecting toward the buffing rolls and adapted to support elongated tubular articles thereon for movement axially of the spindles, and means carried by said head for partially turning said spindles in unison for presenting various longitudinal surfaces of the articles for action by said rolls.

5. In buffing apparatus including oppositely turning buffing rolls, a work supporting fixture including a carriage, means for guiding the carriage reciprocably in to and fro movement in a path substantially perpendicular relative to the axes of rotation of said buffing rolls, means for motivating the carriage, a fixture head carried by the carriage, said fixture head having a plurality of coextensive laterally aligned spaced spindles projecting toward the buffing rolls and adapted to support elongated tubular articles thereon, and rack and pinion means connecting the spindles for partial rotation in unison to present various longitudinal areas of the surfaces of the articles for action thereon of the buffing rolls.

6. In buffing apparatus including oppositely turning buffing rolls, a work supporting fixture including a carriage, means for guiding the carriage reciprocably in to and fro movement in a path substantially perpendicular relative to the axes of rotation of said buffing rolls, means for motivating the carriage, a fixture head carried by the carriage, said fixture head having a plurality of coextensive laterally aligned spaced spindles projecting toward the buffing rolls and adapted to supported elongated tubular articles thereon for movement axially of the spindles, and rack and pinion means connecting the spindles for partial rotation in unison to present various longitudinal areas of the surfaces of the articles for action thereon of the buffing rolls, and a lever connected to the rack for selectively actuating the same.

7. In a buffing fixture for elongated hollow articles such as knife handles, a carriage, a head supported by said carriage and including an elongated head bar rotatably supporting in coextensive spaced lateral alignment a plurality of work supporting spindles, each of said spindles having a pinion, a rack meshing with said pinions, a handle carried by said head and connected to said rack so as to selectively actuate the rack to partially turn said spindles for presenting various selected surfaces of the knife handles for buffing action of buffing rolls thereon.

8. In a buffing fixture for elongated hollow articles such as knife handles, a carriage, a head supported by said carriage and including an elongated head bar rotatably supporting in coextensive spaced lateral alignment a plurality of work supporting spindles, each of said spindles having a pinion, a rack meshing with said pinions, a handle carried by said head and connected to said rack so as to selectively actuate the rack to partially turn said spindles for presenting various selected surfaces of the knife handles for buffing action of buffing rolls thereon, said handle being pivotally mounted and having a fixed range of swinging pivotal movement for a predetermined range of movement of the rack corresponding to a desired extent of partial turning of said spindles which is substantially less than 180°.

9. In a buffing fixture of the character described, a member providing an elongated support, a plurality of work supporting spindles rotatably supported in coextensive spaced alignment by said elongated member, each of the spindles having a pinion thereon, a rack meshing with all of said pinions, a support on said supporting member, an actuating lever carried by said support and having an actuating finger engaging within a recess in the rack, said lever being arranged to be actuated for longitudinally motivating the rack for turning the pinions to rotate the spindles, and stop means for limiting the range of movement of the lever to an extent such as to afford less than 180° of turning of said pinions and said spindles.

10. In a buffing fixture of the character described, a member providing an elongated support, a plurality of work supporting spindles rotatably supported in coextensive spaced alignment by said elongated member, each of the spindles having a pinion thereon, a rack meshing with all of said pinions, a support on said supporting member, an actuating lever carried by said support and having an actuating finger engaging within a recess in the rack, said lever being arranged to be actuated for longitudinally motivating the rack for turning the pinions to rotate the spindles, and stop means for limiting the range of movement of the lever to an extent such as to afford less than 180° of turning of said pinions and said spindles, said stop means comprising the opposite sides of a notch in a member carried by said supporting member.

11. In a buffing fixture of the character described, a carriage, said carriage having upright supports, a buffing head including a bar having trunnions journaled on the upper ends of said uprights, a plurality of coextensive laterally aligned and spaced spindles carried by said head bar, said spindles being movable into loading and buffing positions by swinging of the bar about its trunnions and means for reciprocating said carriage axially of said spindles in the buffing position thereof.

12. In a buffing fixture of the character described, a carriage, said carriage having upright supports, a buffing head including a bar having trunnions journaled on the upper ends of said uprights, a plurality of coextensive laterally aligned and spaced spindles carried by said head bar, said spindles being movable into loading and buffing positions by swinging of the bar about its trunnions, said spindles being rotatable, and means for partially rotating the spindles including a handle which is also operable to rotate the bar about its trunnions.

References Cited in the file of this patent
UNITED STATES PATENTS

| | | |
|---|---|---|
| 2,249,755 | Fingado et al. | July 22, 1941 |
| 2,276,059 | Moon | Mar. 10, 1942 |
| 2,458,708 | Johnson et al. | Jan. 11, 1949 |